United States Patent [19]

Hori et al.

[11] 4,165,121

[45] Aug. 21, 1979

[54] DEVICE FOR OPENING AND CLOSING A SIDE PLATE OF A LOADING BOX ON A MOTOR TRUCK UNDER NO-LOAD CONDITION

[75] Inventors: Masaki Hori, Tokyo; Hisashi Hori, Yokohama, both of Japan

[73] Assignee: Jidosha Seiko Co., Ltd., Tokyo, Japan

[21] Appl. No.: 829,455

[22] Filed: Aug. 31, 1977

Related U.S. Application Data

[62] Division of Ser. No. 672,308, Mar. 31, 1976, abandoned.

[51] Int. Cl.² .................................................. B60J 5/10
[52] U.S. Cl. ................................... 296/57 A; 16/1 C
[58] Field of Search .................. 296/146, 57 A, 57 R; 16/1 R, 1 C, 80, 71

[56] References Cited

U.S. PATENT DOCUMENTS

| 933,070 | 9/1909 | Gleason | 16/1 C |
| 2,151,335 | 3/1939 | Rush | 16/1 C |
| 2,719,320 | 10/1955 | O'Neill | 296/57 A |

FOREIGN PATENT DOCUMENTS

| 462957 | 2/1950 | Canada | 296/57 |
| 11508 | of 1907 | United Kingdom | 296/57 A |
| 219131 | 7/1924 | United Kingdom | 296/57 A |
| 677735 | 8/1952 | United Kingdom | 296/57 A |

*Primary Examiner*—Philip Goodman
*Attorney, Agent, or Firm*—Burns, Doane, Swecker & Mathis

[57] ABSTRACT

In a device for opening and closing a side plate of a loading box on a motor truck under no-load condition wherein the side plate is outwardly openably hinged at its bottom edge to the outer side edge of the floor plate of the loading box, an actuating or interlocking mechanism is provided which comprises an upper actuating connecting rod and a lower actuating connecting rod. The upper actuating connecting rod has the upper end thereof articulated to the outer surface of the side plate and the lower end thereof articulated to the upper end of the lower actuating connecting rod, the lower end of which is articulated to a lower portion of a support member downwardly projected from the underside of the floor plate. Thus, the mechanism is twice-foldable. The actuating or interlocking mechanism may be resiliently pulled by a spring having the base thereof connected to the underside of the floor plate.

3 Claims, 16 Drawing Figures

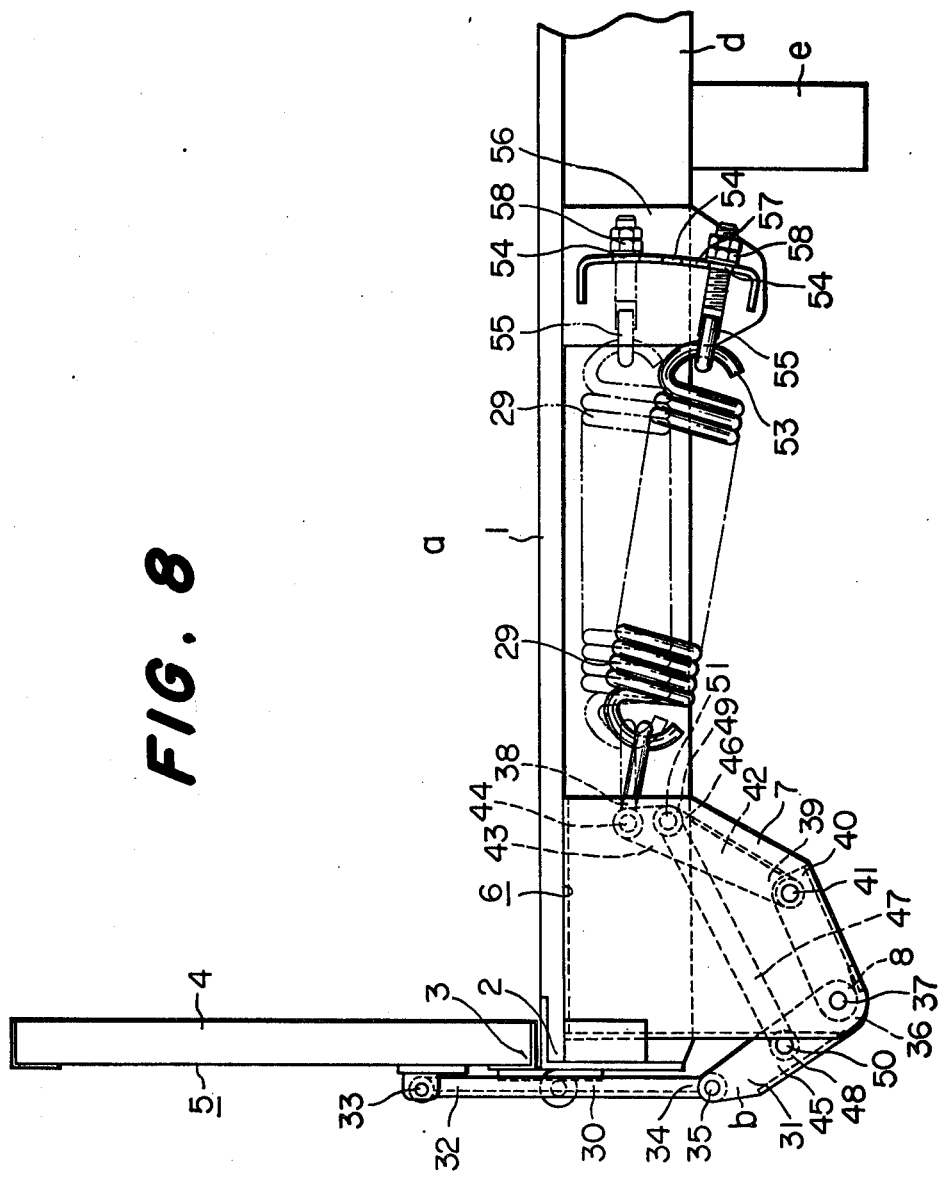

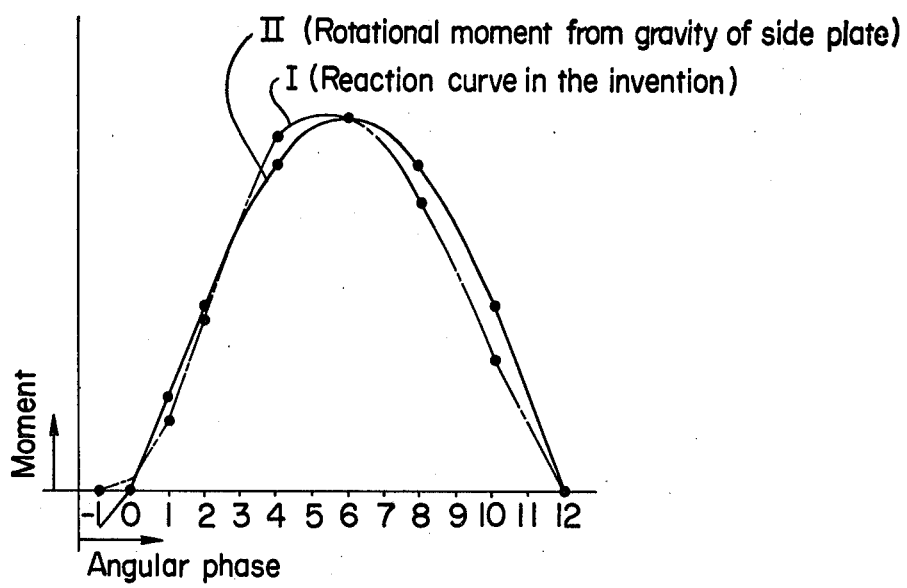
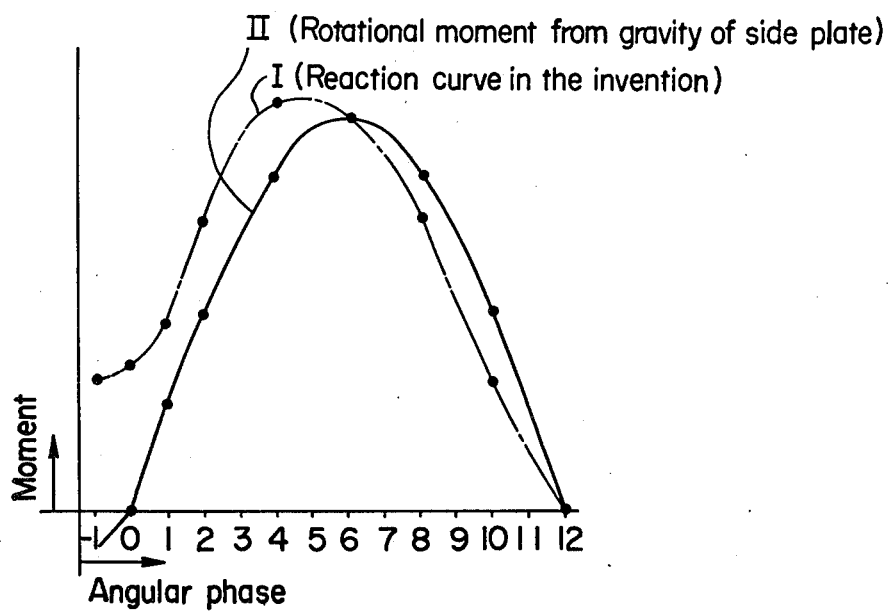

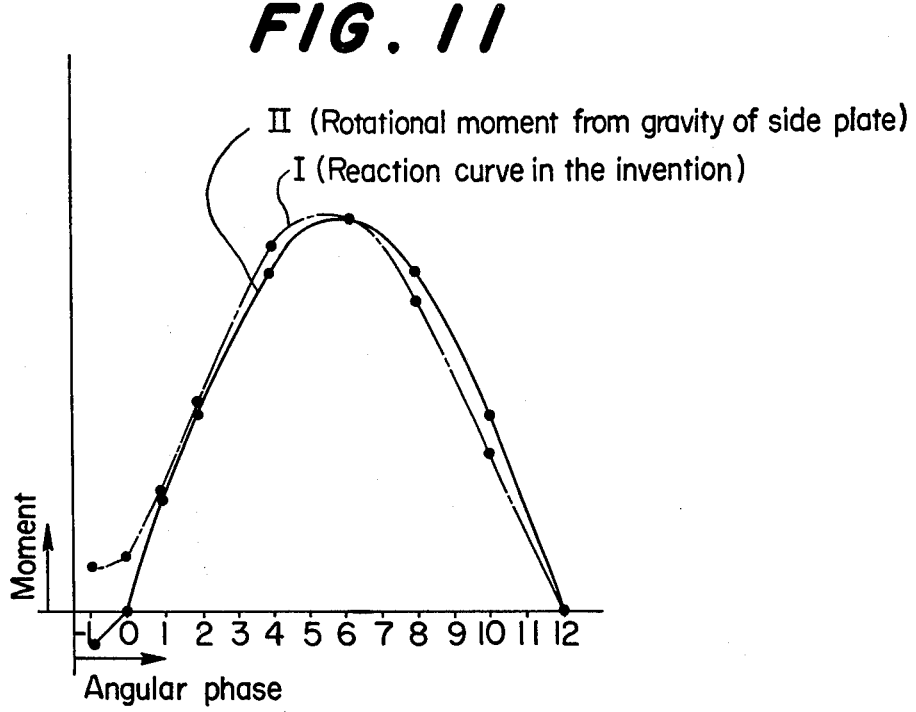

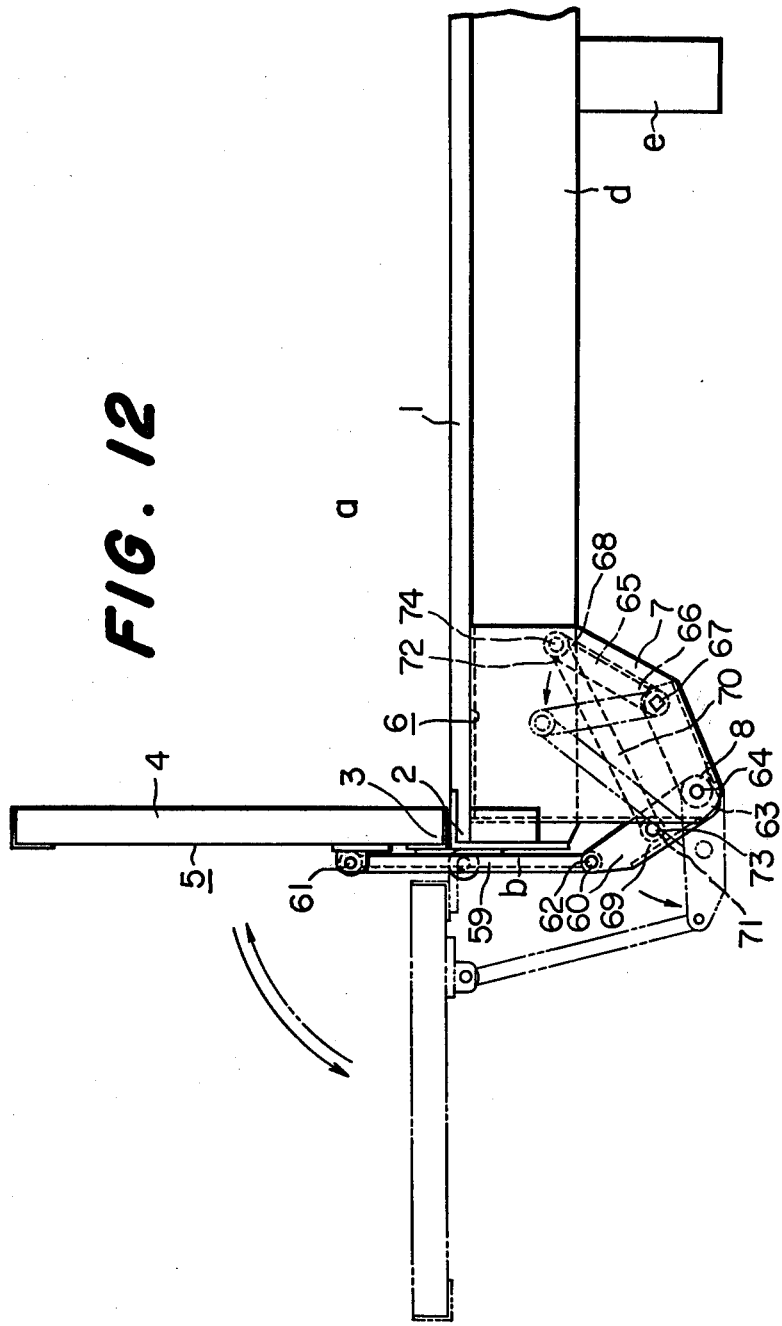

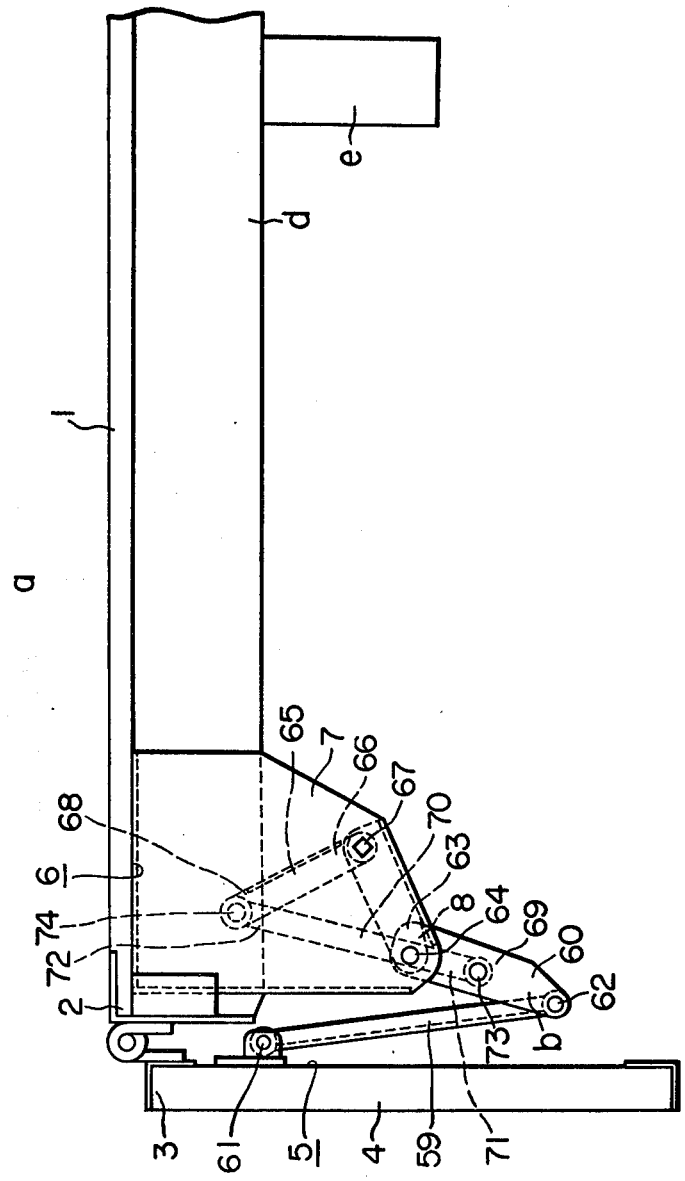

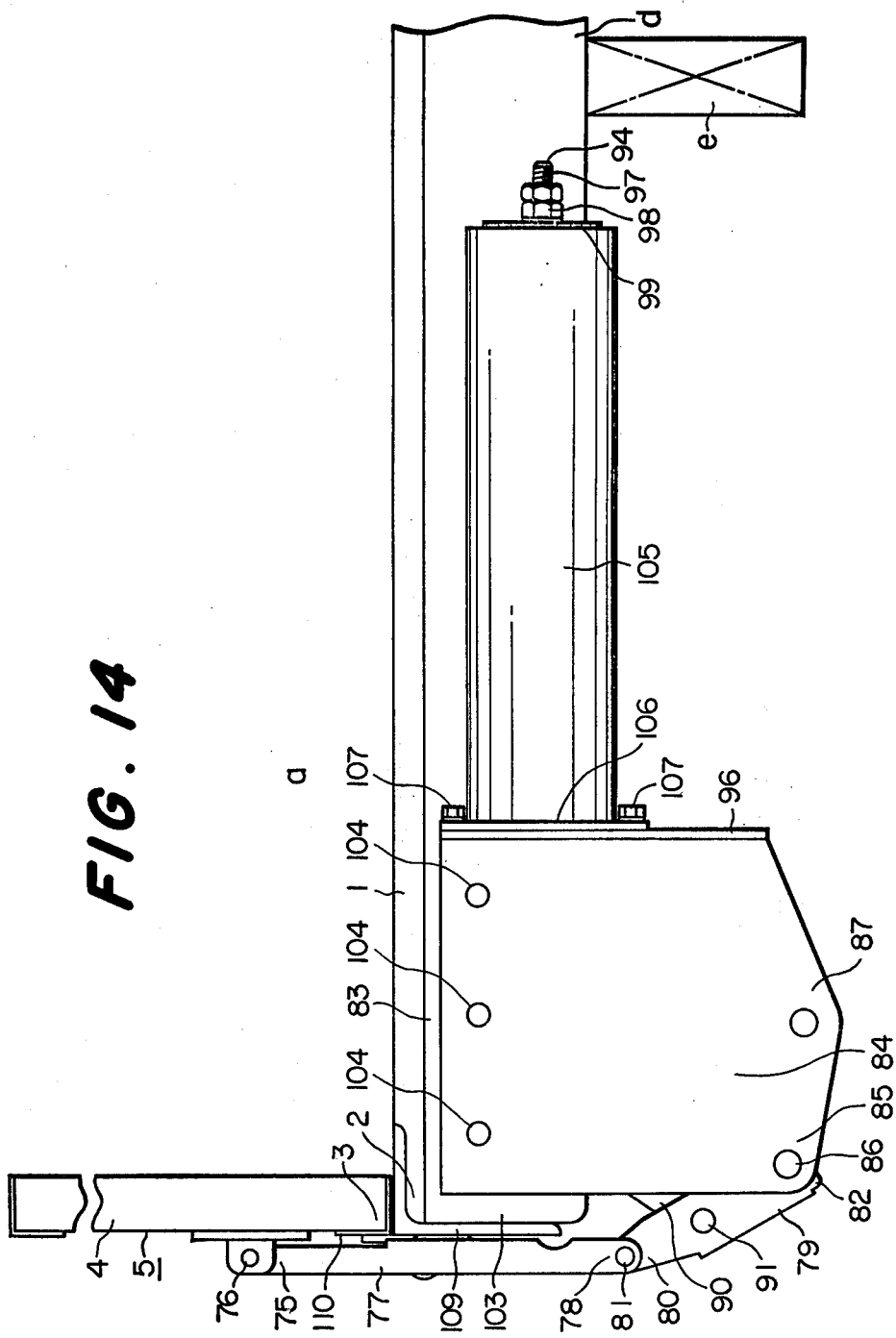

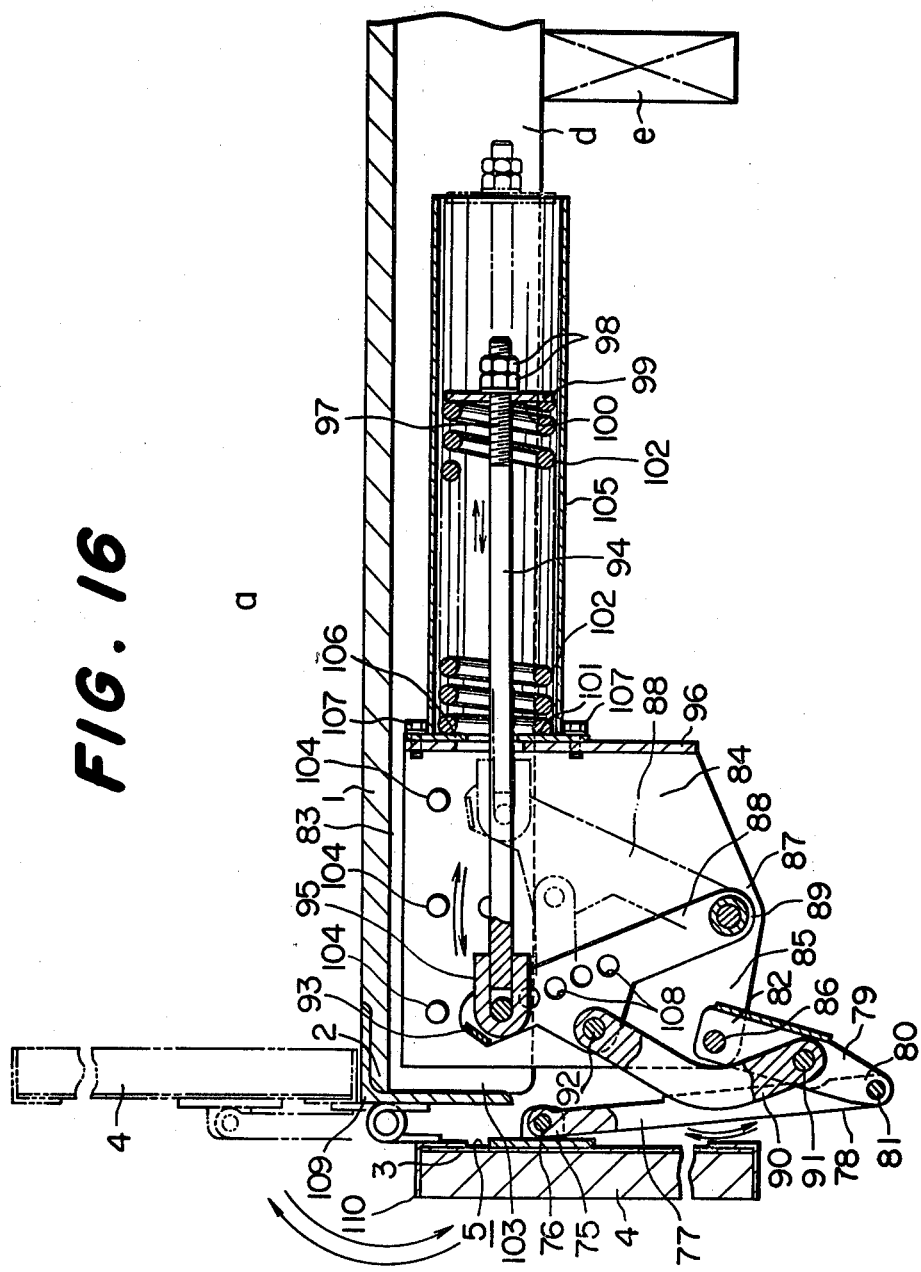

DEVICE FOR OPENING AND CLOSING A SIDE PLATE OF A LOADING BOX ON A MOTOR TRUCK UNDER NO-LOAD CONDITION

This is a division of application Ser. No. 672,308 filed Mar. 31, 1976 now abandoned.

BACKGROUND OF THE INVENTION

1. Field of the Invention

This invention relates to improvements in a device for opening and closing a side plate of a loading box on a motor truck under no-load condition.

2. Description of the Prior Art

When a side plate or door of the loading box is pivotally opened or closed, the rotational moment resulting from the gravity of the side plate is varied and accordingly, the force required for the opening or the closing is also varied.

The conventional opening-closing auxiliary fitting has been operable with a torsion spring attached to the hinge of the side plate or with a plate spring acting on the side plate. In any of these, the action has gradually increased as the pivotal movement of the side plate progresses downwardly, so that the equilibrium in the course of the pivotal movement has been insufficient in most part of the course. In addition, a point of equilibrium has been present in the course of the opening movement to prevent the door from being fully opened.

SUMMARY OF THE INVENTION

It is the object of the present invention to overcome the above-noted disadvantages peculiar to the prior art.

To achieve such an object, the device for opening and closing a side plate of a loading box on a motor truck under no-load condition wherein the side plate is outwardly openably hinged at its bottom edge to the outer side edge of the floor plate of the loading box may basically comprise an actuating or interlocking mechanism comprising an upper actuating connecting rod and a lower actuating connecting rod and twice-foldably articulated. The upper actuating connecting rod has the upper end thereof articulated to the outer surface of the side plate and the lower end thereof articulated to the upper end of the lower actuating connecting rod, the other end of which is articulated to a lower portion of a support member downwardly projected from the underside of the floor plate. The actuating or interlocking mechanism may be resilicently pulled downwardly and sidewise of the floor plate by a spring having the base thereof connected to the underside of the floor plate.

According to the present invention, the action force resulting from the door becomes smaller or null as the door approaches the fully opened position during its downwardly opening movement or when it is in downwardly suspended position, but under such condition, the action force of the spring is great while the line of action approaches the support axis of the actuating connecting rod, whereby the rotational moment becomes smaller and thus, a reaction force approximate to the pivotal movement force due to the gravity acts at all times during the door opening operation. This is highly useful.

The invention will hereinafter be described with respect to various embodiments thereof as shown in the accompanying drawings, throughout which identical reference characters designate identical or equivalent parts.

BRIEF DESCRIPTION OF THE DRAWINGS

FIGS. 7 and 8 show, in front view, alternative forms of the second embodiment.

FIGS. 9, 10 and 11 are graphs of curves for reaction forces.

FIG. 12 is a front view of a third embodiment.

FIG. 13 is a front elevation illustrating the operation of the third embodiment.

FIG. 14 is a front elevation of a fourth embodiment.

FIG. 16 illustrates the operation of the fourth embodiment.

DESCRIPTION OF THE PREFERRED EMBODIMENTS

First Embodiment

Figure 1:
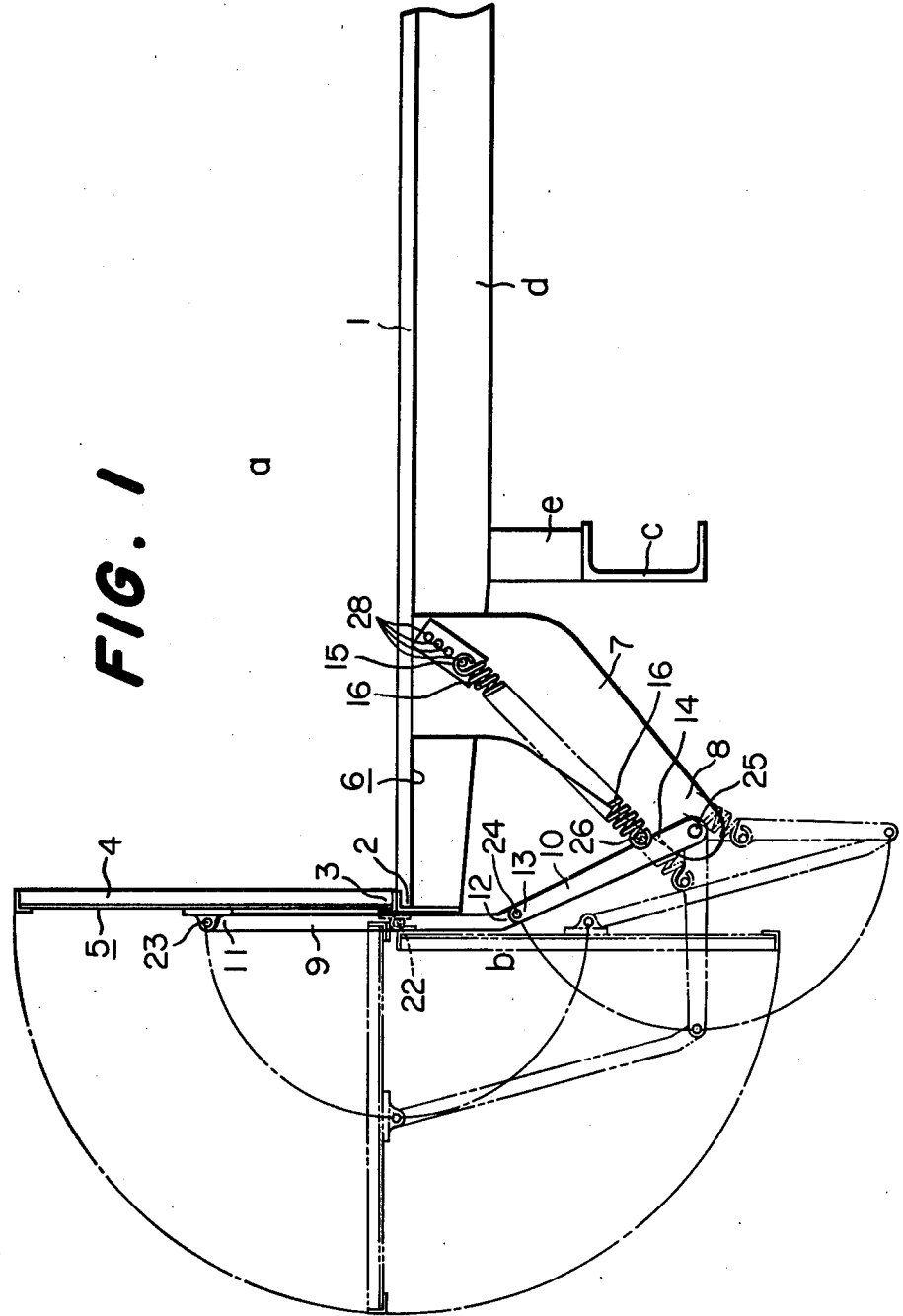
FIG. 1 is a side view showing the arrangement according to a first embodiment of the present invention.

Referring to FIGS. 1 to 4, the loading box a of a motor truck includes a floor plate 1 having an outer side edge 2. At its bottom edge 3, a side plate 4 is outwardly openably hinged to the outer side edge 2, and an upper actuating connecting rod 9 has the upper end 11 thereof articulated to the outer surface 5 of the side plate 4 and has the lower end 12 thereof articulated to the upper end 13 of a lower actuating connecting rod 10 which is in turn articulated to the lower portion 8 of a support arm 7 downwardly depending from the underside 6 of the floor plate 1, thus providing an actuating mechanism b. A portion 14 of the lower actuating connecting rod 10 may be resiliently pulled by a spring 16 which may have its base 15 engaged with the underside of the floor plate 1. Alternatively, such spring may have its lower end 17 engaged with one end 21 of a flexible connecting cord 20, which in turn has its base end 18 engaged with a portion 14 of the lower actuating connecting rod 10 of the actuating mechanism b and has its intermediate portion supported and guided by a support rooler 19. There is further seen a chassis frame c, a cross sill d, a vertical sill e, a hinge 22, articulation pivots 23, 24, 25, 26, a shaft 27 for the support roller 19, and a plurality of spring force adjusting engagement members 28 which may be selectively engaged by the spring 16 to change the initial tension of the spring.

Thus, the pull force of the spring may always be maintained constant by actuating the spring through the agency of the flexible connecting cord.

Figure 2:
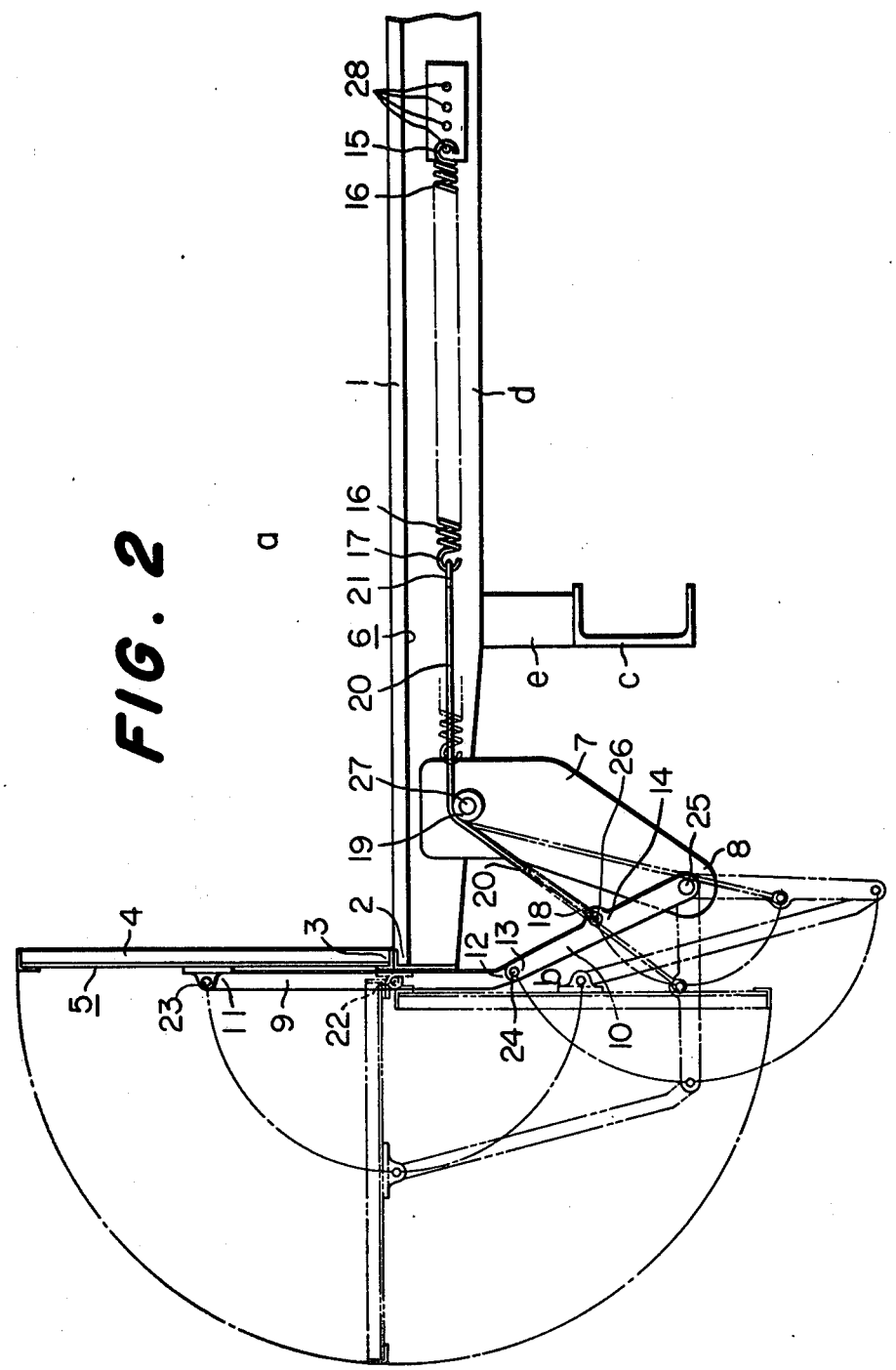
FIG. 2 is a side view showing an alternative form of the first embodiment of the present invention.
Figure 3:
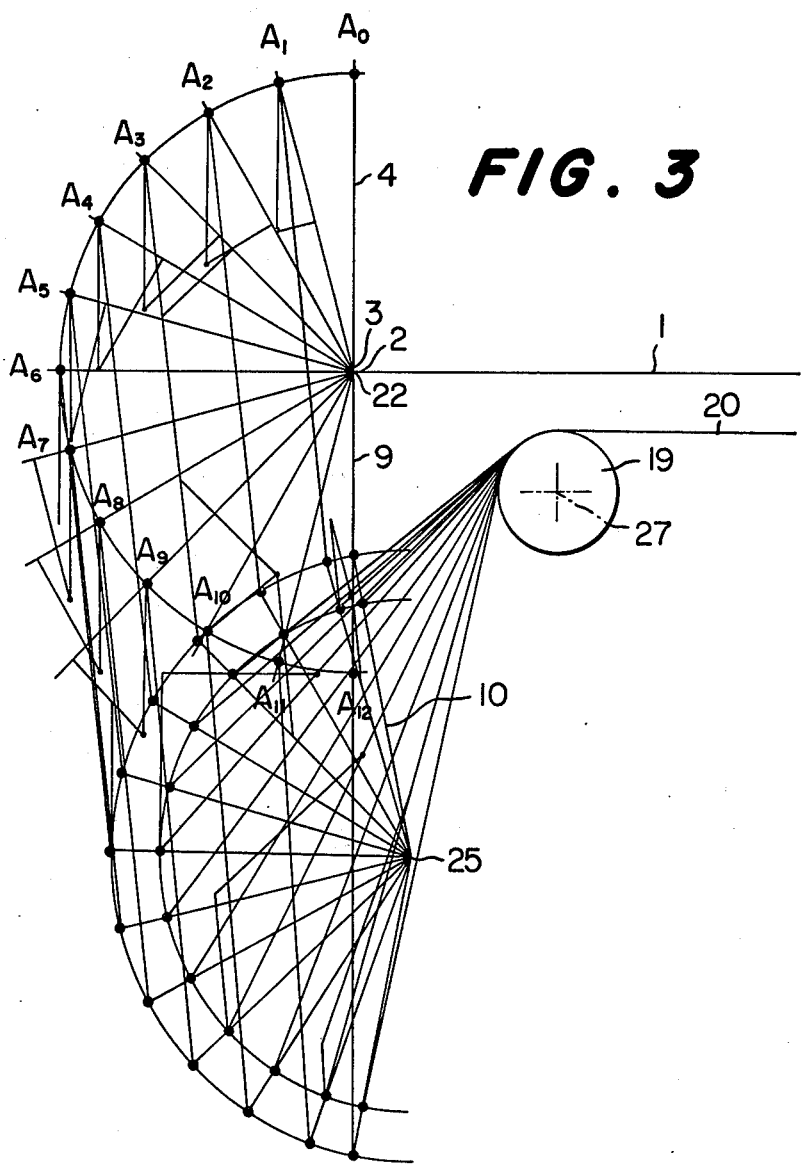
FIG. 3 illustrates the operation of the FIG. 2 embodiment.
Figure 4:
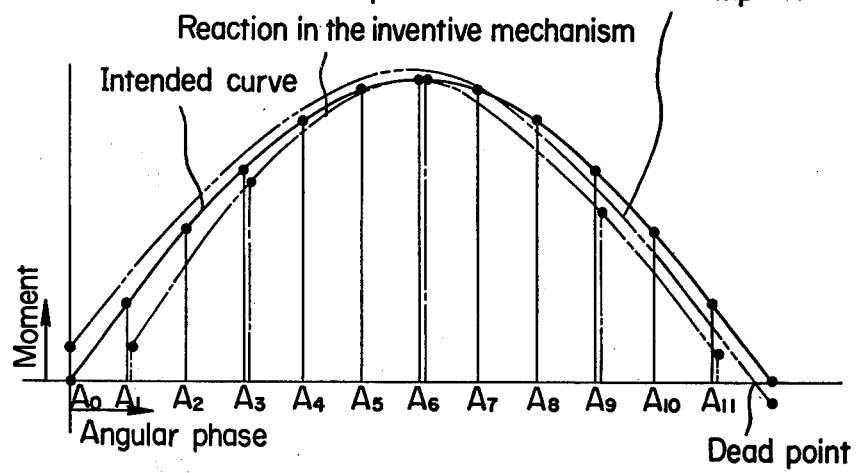
FIG. 4 is a graph illustrating the moment of load in the FIG. 2 embodiment.
Figure 5:
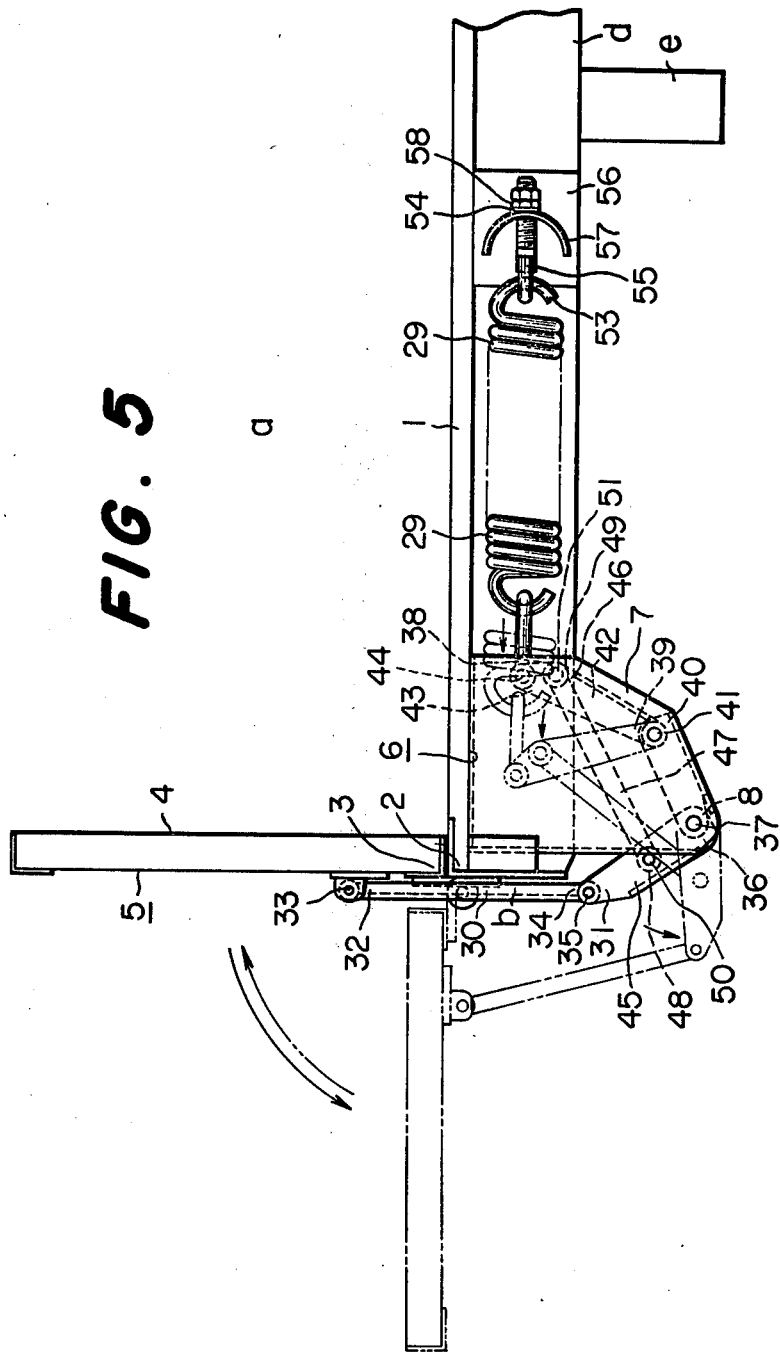
FIG. 5 is a front view of a second embodiment of the present invention.
Figure 6:
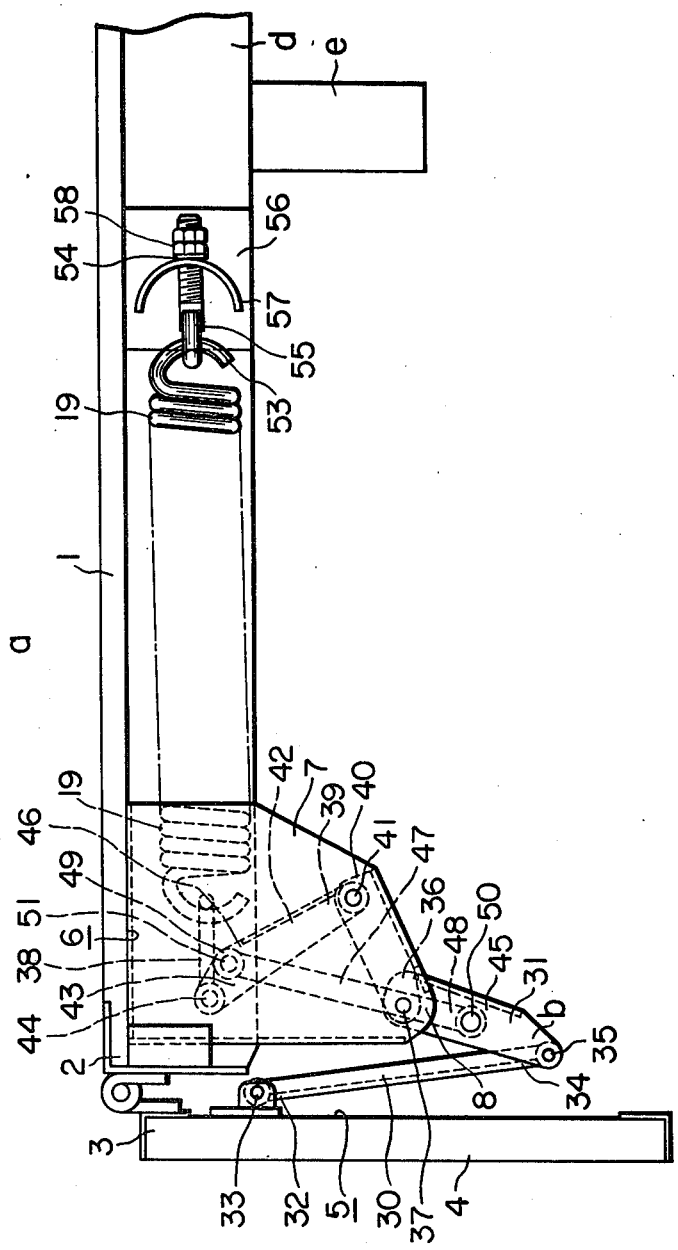
FIG. 6 is a front elevation illustrating the operation of the second embodiment.

FIG. 3 illustrates the operation of the FIG. 2 embodiment and, as will be seen in FIG. 4, the action force of the spring can easily pass through the dead point to maintain the side plate 4 in its fully opened, downwardly vertical position.

Thus, even for the variation in type of the truck or for the variation in weight of the side plate resulting from its construction, the action force of the present mechanism can be suitably selected and applied by varying the initial tension imparted to the spring or by varying the strength of the spring.

Also, depending on the size of the side plate, it is possible to make the operation of the mechanism effective by a suitable number of side plates.

Thus, according to the present invention, the side plate can be opened and closed always under no-load condition with respect to the gravity thereof.

Second Embodiment

Referring to FIGS. 5 to 11, the loading box a of a motor truck includes a floor plate 1 having an outer side edge 2. At its bottom edge 3, a side plate 4 is outwardly openably hinged to the side edge 2. An interlocking mechanism b for holding the side plate is equilibration by being resiliently pulled downwardly and sidewise of the floor plate by a pull spring 29 comprises two upper and lower actuating connecting rods 30 and 31 and is twice-foldably articulated to a point on the outer surface 5 of the side plate and to the lower portion of a support arm 7 downwardly projected from the underside 6 of the floor plate. More particularly, the upper end 32 of the upper actuating connecting rod 30 may be articulated at 33 to a point on the outer surface 5 of the side plate 4 while the lower end 34 thereof may be articulated at 35 to the upper end of the lower actuating connecting rod 31, the lower end of which may in turn be articulated at 37 to the lower portion 8 of the aforementioned support arm 7. Further, a flicking arm rod 42 may have the lower end 39 thereof articulated to the upper portion 40 of the support arm 7 and may have the upper end 43 engaged with the forward end pulling portion 38 of the pull spring 29. A control connecting rod 47 may have the opposite ends 48 and 49 thereof articulated at 45 and 46 to intermediate portions 50 and 51 of the lower actuating connecting rod 31 and the flicking arm rod 42, respectively. Further alternatively, the adjustment of the pull force of the pull spring 29 may be accomplished by changing the points of articulation 52, 52,—between the flicking arm rod 42 and the support arm 7 or by changing the points of engagement 54, 54,—of the base 53 of the pull spring 29.

Designated by 55 is a rod by which the base 53 of the pull spring 29 is engaged. The base 53 may be engaged in one of engagement holes at points of engagement 54, 54,—provided in a projected support edge 57 formed on a support frame 56 discretely formed projectedly on the underside 6 of the floor plate 1, and then may be fastened by a nut 58.

When the side plate of the motor truck is opened or closed under no-load condition by operating the interlocking mechanism for holding the side plate in equilibration by being resiliently pulled downwardly and sidewise of the floor plate by the pull spring which comprises two upper and lower actuating connecting rods and is twice-foldably articulated to a point on the outer surface of the side plate and to the lower portion of the support arm downwardly projected from the underside of the floor plate, the pull spring may sometimes be broken during the operation because it is directly connected to the interlocking mechanism.

Thus, in putting the device of this type into practice, it is necessary that an assistance may be provided even for other side plate which will undergo a different moment of load exerted on the upper actuating connected rod 30 of the actuating mechanism b of the device, because the weight per meter, height, length and other factors of the same device vary within a certain range.

If the moment of load exerted on the actuating connecting rod 30 of this device is greater than the standard moment of load and if the difference is small, it will offer no inconvenience simply to adjust the pull spring alone but, if the difference is great, the curve I of the reaction force resulting from the device will be widely deviated from the curve II of the rotational force resulting from the gravity of the side plate, as seen in FIG. 10.

Figure 7:
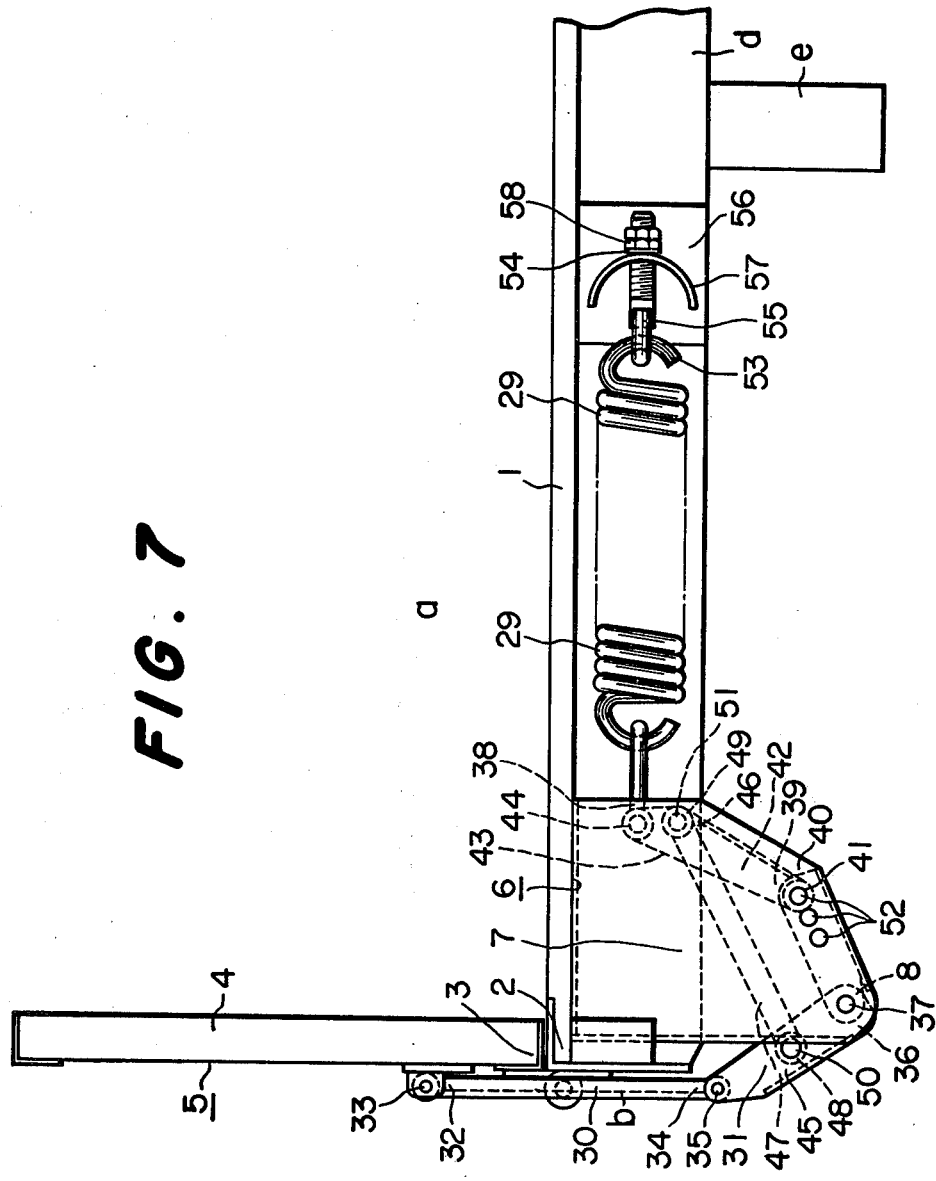

Therefore, when the device of the present invention is used by being attached to a side plate which will undergo a greater moment of load than the standard moment of load of this device, it is possible to assist the spring by changing the point of articulation between the flicking arm rod 42 and the support arm 7 as shown in FIG. 7 or changing the point of engagement of the base of the pull spring as shown in FIG. 8, in accordance with an increase in the moment of load, thereby adjusting the operating angle of the pull spring.

FIG. 11 is a graph illustrating the curve of the reaction force provided by changing the point of articulation of the flicking arm rod and adjusting the pull spring in order that the device may be attached to a side plate which will undergo a greater moment of load.

Thus, according to the present device, the standard moment of load is first determined and a pull spring matching the same is chosen, thereby determining the type of the device. However, even in the same type of the device, assistant is given only by adjustment of the pull spring in a case where the increment of the moment of load is slight, and when the increment of the moment of load is too great to assist only by the adjustment of the pull spring, it is possible to assist a gate somewhat different in type (length, height and weight or moment of load) either by changing the point of articulation between the flicking arm rod 42 and the support arm 7 or changing the point of engagement of the base of the pull spring 29.

Third Embodiment

Referring to FIGS. 12 and 13, the loading box a of a motor truck includes a floor plate 1 having an outer side edge 2. At its bottom edge 3, a side plate 4 is outwardly openably hinged to the side edge 2. An interlocking mechanism b for holding the side plate in equilibration by being resiliently pulled downwardly and sidewise of the floor plate by a pull spring comprises two upper and lower actuating connecting rods 59 and 60 and is twice-foldably articulated to a point on the outer surface 5 of the side plate and to the lower portion 8 of a support arm 7 downwardly projected from the underside 6 of the floor plate. Such interlocking mechanism b may be operated to open or close the side plate of the loading box of the motor truck. The upper end of the upper actuating connecting rod 59 is articulated at 61 to a point on the outer surface 5 of the side plate while the lower end thereof is articulated at 62 to the upper end of a lower actuating connecting rod 60, the lower end 63 of which is in turn articulated at 64 to the lower portion 8 of the support arm. Further, the lower end 66 of a flicking arm rod 65 is articulated to the upper portion of the support arm 7 by means of a resilient torsion shaft 67, and the opposite ends 71 and 72 of a control connecting rod 70 are articulated at 73 and 74 to the upper portion 68 of the flicking arm rod 65 and the intermediate portion 69 of the lower actuating connecting rod 60, respectively.

When the side plate of the motor truck is opened or closed under no-load condition by operating the interlocking mechanism for holding the side plate in equilibration by being resiliently pulled downwardly and sidewise of the floor plate by the pull spring which comprises two upper and lower actuating connecting rods and is twice-foldably articulated to a point on the outer surface of the side plate and to the lower portion of the support arm downwardly projected from the underside of the floor plate, the pull spring may sometimes be broken during the operation because it is directly connected to the interlocking mechanism.

Such breakage of the spring may be prevented by the present mechanism.

In this embodiment, the upper end of the upper actuating connecting rod is articulated to a point on the outer surface of the side plate while the lower end thereof is articulated to the upper end of the lower actuating connecting rod, the lower end of which is in turn articulated to the lower portion of the support arm. Further, the lower end of the flicking arm rod is articulated to the upper portion of the support arm by means of the resilient torsion shaft, and the opposite ends of the control connecting rods are articulated to the upper portion of the flicking arm and the intermediate portion of the lower actuating connecting rod, respectively, whereafter the standard moment of load is first determined, and then a resilient torsion shaft matching the same is chosen, thereby determining the type of the device.

Fourth Embodiment

Figure 15:
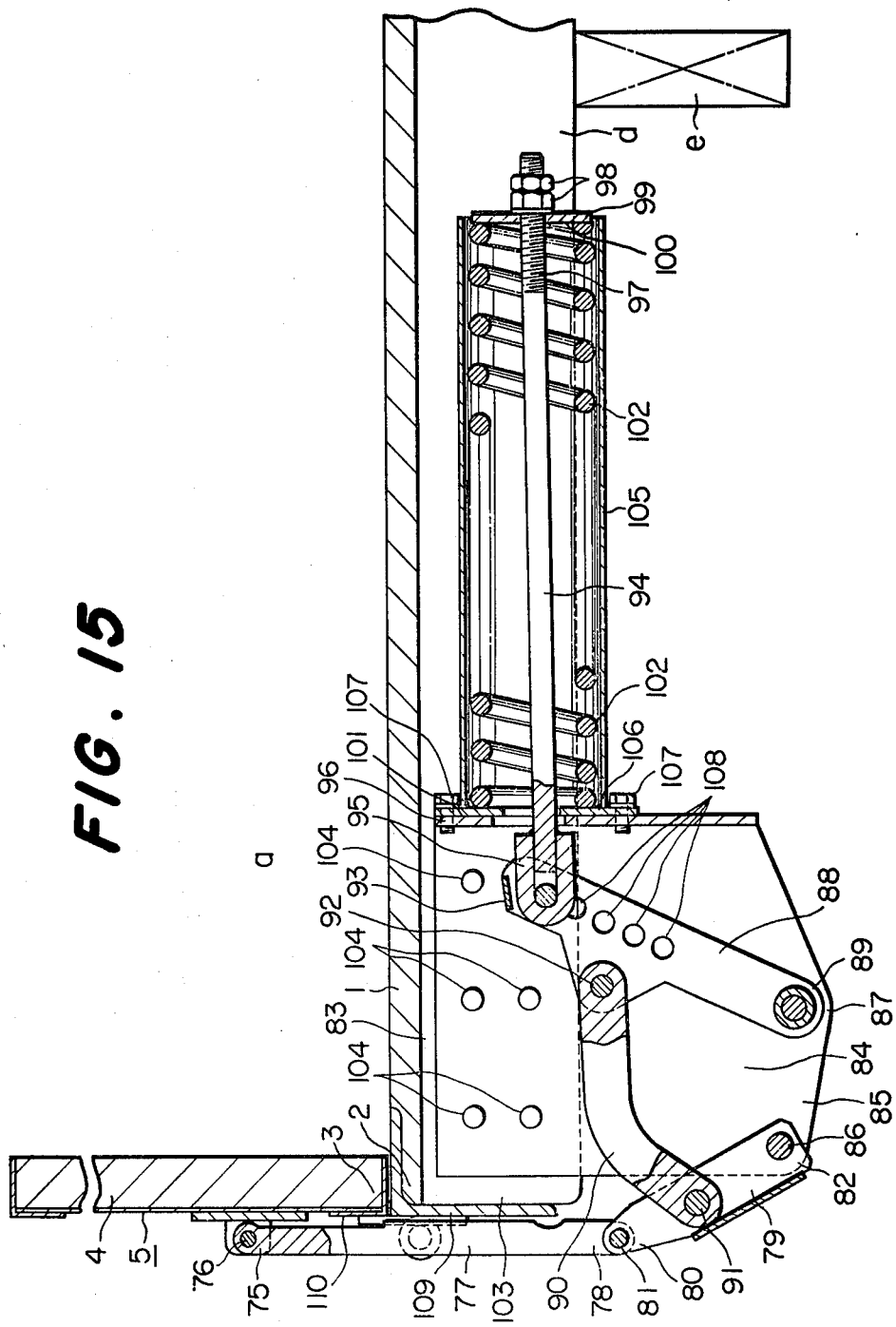
FIG. 15 is a vertical cross-sectional view of the fourth embodiment.

Referring to FIGS. 14 to 16, the loading box a of the motor truck includes a floor plate 1 having an outer side edge 2. At its bottom edge 3, a side plate 4 is outwardly openably hinged to the side edge 2. An upper actuating connecting rod 77 has the upper end 75 thereof articulated at 76 to a point on the outer surface 5 of the side plate 4. Articulated at 81 to the lower end 78 of the upper actuating connecting rod 77 is the upper end 80 of a lower actuating connecting rod 79, the lower end 82 of which is in turn articulated at 86 to the lower side edge 85 of a support frame 84 downwardly projected from the underside 83 of the floor plate 1. Articulated to the bottom edge 87 of the support frame 84 is the lower portion 89 of a flicking arm rod 88. The intermediate portion of the lower actuating connecting rod 79 and the intermediate portion of the flicking arm rod 88 are articulated at 91 and 92 to the opposite ends of a control connecting rod 90. The base 95 of a spring resiliency adjusting rod 94 is engaged with the upper end 93 of the flicking arm rod 88, and the spring resiliency adjusting rod 94 extends through the rearward projected edge 96 of the support frame 84. A set plate 99 is fitted to the threaded end portion 97 and fastened thereto by an adjust nut 98. A compression spring 102 is interposed between the inner surface 100 of the set plate 99 and the outer surface 101 of the rearward projected edge 96 of the support frame 84. Designated by 103 is a connecting beam to which the support frame 84 is connected by rivets 104.

Denoted by 105 is a support cylinder for the compression spring 102 and the bottom frame plate 106 of the support cylinder is fastened to the projected edge 96 by threaded rods 107. Reference numeral 108 designates and adjust hole, and reference numerals 109 and 110 denote mounting angle rods.

According to the present embodiment, a compression spring is employed instead of a pull spring in the device for opening the side plate of the loading box on the motor truck under no-load condition which comprises the interlocking mechanism for holding the side plate is equilibration by being resiliently pulled downwardly and sidewise of the floor plate by the spring, the interlocking mechanism consisting of two upper and lower actuating connecting rods and being twice-foldably articulated to a point on the outer surface of the side plate and to the lower portion of the support arm downwardly projected from the underside of the floor plate. The compression spring has its spring resiliency adjustable simply by tightening or loosening the adjust nut on the threaded portion of the spring resiliency adjusting rod to thereby adjust the set plate to which the compression spring provided on the adjusting rod is secured.

We claim:

1. A device for opening and closing a side plate of a loading box on a motor truck under no-load condition, the side plate being outwardly openably hinged at its bottom edge to the outer side edge of the floor plate of said loading box, said device comprising an interlocking mechanism consisting of two upper and lower actuating connecting rods and twice-foldably articulated to a point on the outer surface of said side plate and to the lower portion of a support arm downwardly depending from the underside of said floor plate, said interlocking mechanism being resiliently pulled by a pull spring downwardly and sidewise of said floor plate to hold said side plate in equilibration, said upper actuating connecting rod having the upper end thereof articulated to said point on the outer surface of said side plate and having the lower end thereof articulated to the upper end of said lower actuating connecting rod, the lower end of said lower actuating connecting rod being articulated to the lower portion of said support arm, a flicking arm rod having the lower end thereof articulated to the upper portion of said support arm, the upper end of said flicking arm rod being engaged with the forward end pulling portion of said pull spring, and a control connecting rod having the opposite ends thereof articulated to intermediate portions of said lower actuating connecting rod and said flicking arm rod, respectively, the pull force of said pull spring being adjustable by changing the point of articulation between said flicking arm and said support arm or by changing the point of engagement of the base portion of said pull spring.

2. An apparatus for counterbalancing the force of gravity on a vehicle door, the door being hinged at its bottom edge to open outwardly from the vehicle, comprising:

a first connecting rod, an upper portion of which is pivotably connected to an outer surface of the door;

a support arm extending downwardly from the body of the vehicle;

a second connecting rod, a first end portion of which is pivotably connected to said support arm and a second opposite end portion of which is pivotably connected to a lower portion of said first connecting rod; and, means pivotably connected intermediate the end portions of said second connecting rod for biasing the door toward a closed position, said biasing means including a flicking arm, a lower portion of which is pivotably connected to said support arm, a spring connected between the vehicle and an upper portion of said flicking arm, and a control arm, a first end portion of which is pivotably connected intermediate the upper and lower portions of said flicking arm, and a second end portion of which is connected to said second connecting rod.

3. The apparatus of claim 2 wherein said spring is a compression spring, and wherein said control arm is arcuate.

* * * * *